United States Patent
Ryu et al.

(10) Patent No.: US 9,481,239 B2
(45) Date of Patent: Nov. 1, 2016

(54) MISFUELLING PREVENTION APPARATUS FOR VEHICLES

(71) Applicant: Hyundai Motor Company, Seoul (KR)

(72) Inventors: Bu Yeol Ryu, Hwaseong-si (KR); Pil Seon Choi, Anyang-si (KR); Bo Sung Lee, Daejeon (KR)

(73) Assignee: Hyundai Motor Company, Seoul (KR)

( * ) Notice: Subject to any disclaimer, the term of this patent is extended or adjusted under 35 U.S.C. 154(b) by 197 days.

(21) Appl. No.: 14/104,746

(22) Filed: Dec. 12, 2013

(65) Prior Publication Data

US 2015/0069058 A1 Mar. 12, 2015

(30) Foreign Application Priority Data

Sep. 6, 2013 (KR) ........................ 10-2013-0107051

(51) Int. Cl.
*B60K 15/04* (2006.01)

(52) U.S. Cl.
CPC ....... *B60K 15/04* (2013.01); *B60K 2015/0461* (2013.01); *B60K 2015/0483* (2013.01)

(58) Field of Classification Search
CPC .................................................. B60K 15/077
USPC ............ 141/286, 311 R, 312, 348, 349, 350, 141/351, 352, 356, 363, 367, 369, 370, 372, 141/390; 220/4.14, 86.2, 86.4
See application file for complete search history.

(56) References Cited

U.S. PATENT DOCUMENTS

| | | | | |
|---|---|---|---|---|
| 2,006,748 A * | 7/1935 | Ritz-Woller | ....... | B60K 15/0403 220/293 |
| 5,071,020 A * | 12/1991 | Reutter | .............. | B65D 51/1644 220/203.06 |
| 5,195,566 A * | 3/1993 | Ott | ..................... | B60K 15/0406 141/312 |
| 5,361,924 A * | 11/1994 | Muller | ............... | B60K 15/0406 220/293 |
| 5,385,256 A * | 1/1995 | Brown | ................... | B60K 15/04 220/315 |
| 5,395,004 A * | 3/1995 | Griffin | ............... | B60K 15/0406 220/293 |
| 5,437,317 A * | 8/1995 | Takatsuka | ........ | B60K 15/03519 137/589 |
| 5,480,055 A * | 1/1996 | Harris | ................ | B60K 15/0406 220/203.26 |
| 5,540,347 A * | 7/1996 | Griffin | ............... | B60K 15/0406 137/493.1 |
| 5,615,793 A * | 4/1997 | Muller | ............... | B60K 15/0409 220/203.06 |
| 5,740,842 A * | 4/1998 | Maier | .............. | B60K 15/03519 137/588 |

(Continued)

FOREIGN PATENT DOCUMENTS

| | | | |
|---|---|---|---|
| DE | EP 1502794 A2 * | 2/2005 | ............ B60K 15/04 |
| EP | 1 790 517 A2 | 5/2007 | |

(Continued)

*Primary Examiner* — Mark A Laurenzi
*Assistant Examiner* — Andrew Schmid
(74) *Attorney, Agent, or Firm* — Morgan, Lewis & Bockius LLP

(57) ABSTRACT

A misfuelling prevention apparatus for vehicles can prevent a diesel vehicle from being filled with a wrong fuel. The apparatus for vehicles may include an upper housing at an entrance of a filler neck, an internal housing located at a bottom of the upper housing while being supported by an interior of the filler neck, a stopper and a stopper spring, and a flapper and a flapper spring. The stopper may be at one side of the internal housing to be rotated around a pin by a contact with an oil gun. One end of the flapper may be rotatably installed in a pin structure at an opposite side of the internal housing with respect to the stopper and the other end of the flapper may be caught in a recess of the stopper. The flapper is to be pushed and selectively opened by the oil gun.

5 Claims, 9 Drawing Sheets

(56) References Cited

U.S. PATENT DOCUMENTS

| | | | | |
|---|---|---|---|---|
| 6,019,348 A * | 2/2000 | Powell | B60K 15/04 | 141/198 |
| 6,230,918 B1 * | 5/2001 | Huynh | B60K 15/0406 | 220/203.06 |
| 6,308,852 B1 * | 10/2001 | Hagano | B60K 15/0406 | 220/293 |
| 6,637,477 B1 * | 10/2003 | Maier | B60K 15/03519 | 137/588 |
| 6,796,451 B2 * | 9/2004 | Harris | F01P 11/0238 | 220/203.22 |
| 8,746,480 B2 * | 6/2014 | Wholey | B60K 15/0403 | 141/286 |
| 2002/0020465 A1 * | 2/2002 | Gzik | B60K 15/04 | 141/390 |
| 2002/0040740 A1 * | 4/2002 | Ozawa | B67D 1/0835 | 141/351 |
| 2002/0088801 A1 * | 7/2002 | Temmesfeld | B60K 15/0406 | 220/86.2 |
| 2003/0075543 A1 * | 4/2003 | Hagano | B60K 15/0406 | 220/255 |
| 2005/0051236 A1 * | 3/2005 | Watson | B60K 15/0403 | 141/370 |
| 2005/0155671 A1 * | 7/2005 | McClung | B60K 15/035 | 141/350 |
| 2006/0096662 A1 * | 5/2006 | King | B60K 15/04 | 141/367 |
| 2008/0308182 A1 * | 12/2008 | Fowler | B60K 15/0403 | 141/370 |
| 2009/0020182 A1 * | 1/2009 | Groom | B60K 15/04 | 141/349 |
| 2009/0145516 A1 * | 6/2009 | Wells | B60K 13/04 | 141/367 |
| 2009/0321441 A1 * | 12/2009 | Horlacher | B60K 15/04 | 220/86.2 |
| 2010/0006178 A1 * | 1/2010 | Muth | B60K 15/04 | 141/350 |
| 2011/0132906 A1 * | 6/2011 | Miller | B60K 15/04 | 220/86.2 |
| 2011/0315682 A1 * | 12/2011 | Tsiberidis | B60K 15/04 | 220/86.2 |
| 2011/0316209 A1 * | 12/2011 | Kerr | B60G 13/02 | 267/293 |
| 2012/0211489 A1 * | 8/2012 | Walser | B60K 15/04 | 220/86.2 |
| 2013/0001226 A1 * | 1/2013 | Breuer | B60K 15/04 | 220/86.2 |
| 2013/0008899 A1 * | 1/2013 | Hisadomi | B60K 15/03 | 220/86.2 |
| 2013/0074987 A1 * | 3/2013 | Breuer | B60K 15/04 | 141/311 R |
| 2013/0092290 A1 * | 4/2013 | Waymire | B60K 15/0403 | 141/286 |
| 2013/0168392 A1 * | 7/2013 | Kuyama | B60K 15/04 | 220/86.2 |
| 2014/0110405 A1 * | 4/2014 | Breuer | B60K 15/04 | 220/86.2 |

FOREIGN PATENT DOCUMENTS

| | | | | |
|---|---|---|---|---|
| GB | EP 1790517 A2 * | 5/2007 | | B60K 15/04 |
| KR | 20-0379665 Y1 | 3/2005 | | |
| KR | 10-2006-0037948 A | 5/2006 | | |
| KR | 10-2007-0012633 A | 1/2007 | | |
| KR | 10-2009-0004113 A | 1/2009 | | |
| KR | 10-2009-0114949 A | 11/2009 | | |

* cited by examiner

MISFUELLING PREVENTION APPARATUS FOR VEHICLES

CROSS-REFERENCE TO RELATED APPLICATION

The present application claims priority of Korean Patent Application Number 10-2013-0107051 filed on Sep. 6, 2013, the entire contents of which application are incorporated herein for all purposes by this reference.

BACKGROUND OF INVENTION

1. Field of Invention

The present invention relates to a misfuelling prevention apparatus for vehicles. More particularly, the present invention relates to a misfuelling prevention apparatus for vehicles that can prevent a diesel vehicle from being filled with a wrong fuel.

2. Description of Related Art

In general, fuel tanks for storing a fuel necessary for combustion of an engine are provided in vehicles. The fuel tank is connected to an oil filling pipe and a fuel filler neck, i.e., an oil filling port, is provided at an end of the oil filling pipe so that a fuel can be filled into the fuel tank through the fuel filler neck. Oil guns for filling a fuel into a fuel filler neck have different diameters according to whether the fuel is a gasoline fuel or a diesel fuel, and the oil filling speeds are also different.

In general, the diameter of an oil gun for a diesel fuel is larger than the diameter of an oil gun for a gasoline fuel. Accordingly, the diameter of the fuel filler neck for a diesel vehicle is larger than the diameter of the fuel filler neck for a gasoline vehicle.

For example, the oil gun for a diesel fuel has a diameter of about 25 mm to 31 mm, and the oil gun for a gasoline fuel has a diameter of about 19 mm to 21 mm. The fuel filling port for a gasoline vehicle has a diameter of about 22 mm, and the fuel filling port for a diesel vehicle has a diameter of about 26 to 32 mm.

Thus, an oil gun for a diesel fuel cannot be inserted into a gasoline vehicle but only an oil gun for a gasoline fuel can be inserted into the gasoline vehicle so that a misfuelling problem does not occur, but since an oil gun for a gasoline fuel as well as an oil gun for a diesel fuel can be inserted into a fuel filling port of a diesel vehicle, a misfuelling problem frequently occurs.

Meanwhile, diesel fuels have been mainly used for large vehicles conventionally, but since cars also have used diesel fuels recently and self-fuelling increases due to high oil prices, cases of filling gasoline into diesel vehicles in gas stations are increasing.

Nowadays, as fuelling costs are increasing, the number of gas stations where drivers fill fuels by themselves is also increasing. In self-service gas stations, a plurality of oil filling sites are disposed such that drivers can directly fill fuels into their vehicles, so that conveniences of drivers can be satisfied.

However, since a gasoline gun for filling a gasoline fuel and a diesel gun for filling a diesel fuel are provided in one oil filling site and two fuel filling switches for selecting kinds of oil are provided in the oil guns, a misfuelling problem of mixing fuels frequently occur when drivers selects a wrong oil gun or a wrong fuel filling switch.

In this way, when a fuel is filled in a diesel vehicle, gasoline misfuelling accidents actually occur frequently. The misfuelling may lower an output of an engine and directly damage the engine, and may stop an operation of the engine during driving, causing a large-size accident. Further, the misfuelling may cause damage to a fuel system such as an injection pump.

In view of the aspect, U.S. Patent Application Publication No. 2012/0211489 A1 discloses that when a diesel gun having a large diameter is inserted, it pushes a boss at an upper portion of a stopper while rotating the stopper and opening a flapper. U.S. Pat. No. 7,661,550 B2 discloses that if a diesel gun having a large diameter is inserted, it pushes a boss and rotates a circumferential structure so that slots formed on left and right sides of the structure open a stopper. U.S. Pat. No. 7,967,042 B2 discloses that when a diesel gun having a large diameter is inserted, it pushes a plurality of circumferential bosses and rotates an external structure to open a stopper.

However, the conventional technologies do not consider inserting a diesel gun having a diameter of 31 mm, and are disadvantageous in the structural and operational aspects. Further, even when a gasoline gun having a small diameter is inserted, an oil filling port may be opened. That is, they cannot ensure the prevention of misfuelling.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides a misfuelling prevention apparatus that realizes a new type of misfuelling prevention structure by which a flapper can be operated to be opened only when a diesel gun is inserted and not to be opened while an entire internal housing is pushed leftwards and rightwards when a stopper is arbitrarily manipulated in the case when a gasoline gun having a small diameter is inserted, by using a difference in diameters of the gasoline gun and the diesel gun, thereby preventing filling of a wrong oil.

In accordance with various aspects of the present invention, there is provided a misfuelling prevention apparatus for vehicles, including: an upper housing installed at an entrance of a filler neck; an internal housing located at a bottom of the upper housing while being supported by an interior of the filler neck; a stopper and a stopper spring, the stopper installed at one side of the internal housing to be rotated around a pin by a contact with an oil gun; and a flapper and a flapper spring, one end of the flapper rotatably installed in a pin structure at an opposite side of the internal housing with respect to the stopper and the other end of the flapper caught in a recess of the stopper, wherein the flapper is to be pushed and selectively opened by the oil gun.

Thus, the flapper can be opened when a diesel gun having a large diameter, such as a diesel car gun (Ø24) and a commercial diesel vehicle gun (Ø31), is inserted; and the flapper cannot be opened when a gasoline gun having a diameter (Ø21) smaller than that of the diesel gun is inserted. Accordingly, filling of a wrong fuel can be prevented.

When an upper end of the internal housing is inserted into a housing spring supported by an inner bottom of the upper housing and an external force is applied to the upper end of the internal housing, the internal housing is freely slid while being resiliently supported by the housing spring.

An upper end of the housing spring and an upper end of the internal housing located within the housing spring may have conical shapes with wide upper ends and narrow lower ends. A resiliency of the housing spring interposed between the upper housing and the internal housing may be smaller than a resiliency of the stopper spring.

The misfuelling prevention apparatus may further include a rotation prevention guide disposed at one side of the upper housing and behind the stopper for constraining rotation of the stopper. An inner diameter of the internal housing may be set to a maximum of 32 mm, and a separation between a contact boss of the stopper protruding to an inside of the internal housing and a wall surface of the housing may be set to 22 mm to 23 mm.

The misfuelling prevention apparatus for vehicles according to the present invention has the following effects.

First, a flapper can be prevented from being opened when an oil gun for a wrong oil is inserted, by using the principle in which the flapper is selectively opened according to a diameter of the oil gun, so that filling of a wrong fuel can be basically prevented. Second, a misfuelling prevention apparatus can be realized in a simple structure and in a simple operation by employing a structure an internal housing can be slid by the medium of an upper housing and a spring of the internal housing, so that misfuelling of oil due to a mistake or manipulation error of an operator can be positively prevented. Third, oil cannot be filled when a gasoline gun is eccentrically inserted or inclined inserted, making it possible to simplify the structure of the apparatus and mass-produce the apparatus. Fourth, the present invention can be widely applied to a commercial diesel vehicle gun (Ø31) as well as a diesel car gun (Ø24). Fifth, the present invention can realize improvement of product values and low costs due to enhancement of convenience of consumers.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
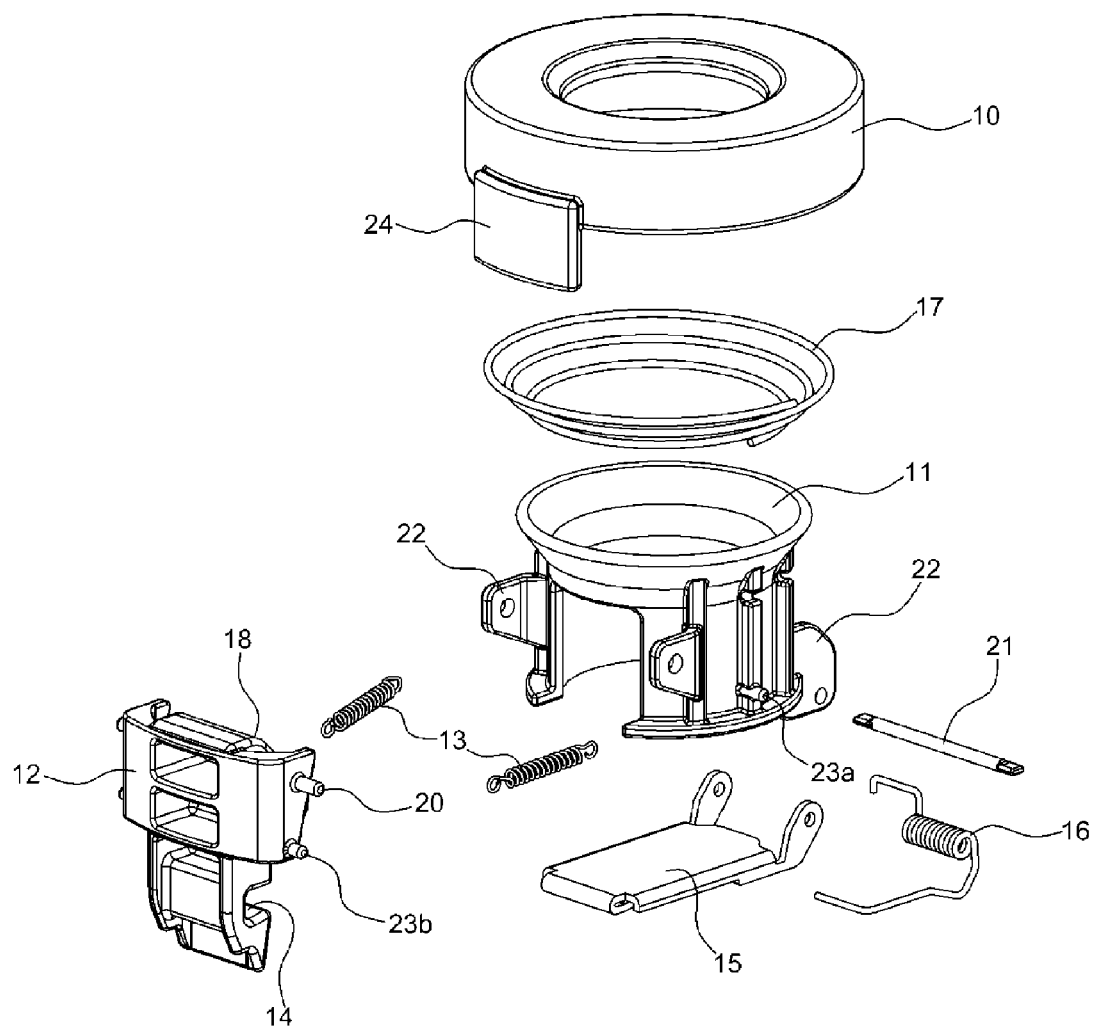
FIG. 1 is an exploded perspective view showing an exemplary misfuelling prevention apparatus for vehicles according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
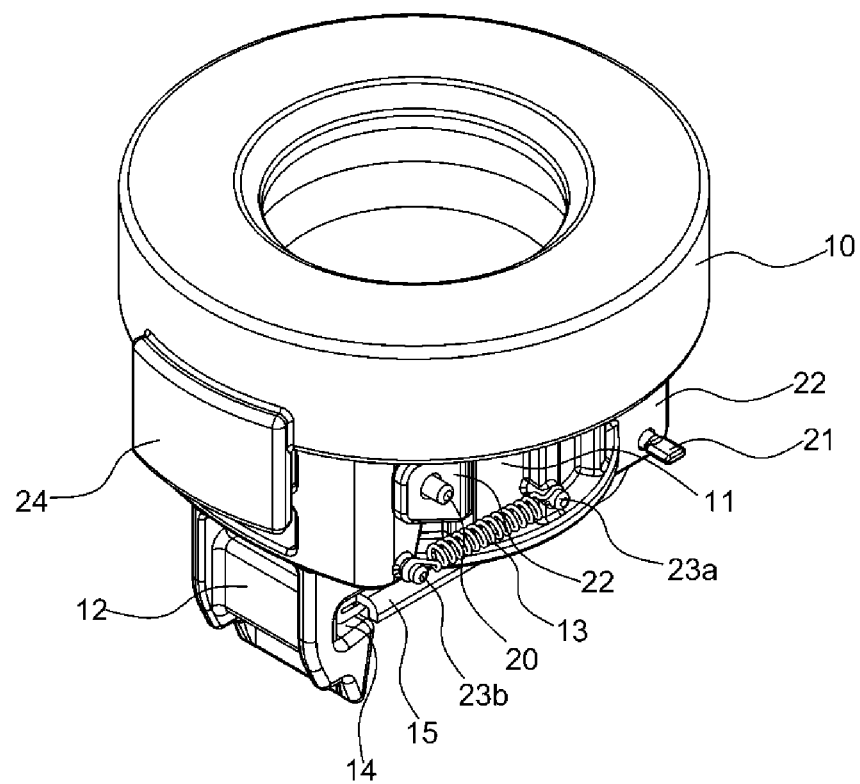
FIG. 2 is a perspective view showing an exemplary misfuelling prevention apparatus for vehicles according to the present invention.

FIG. 1 is an exploded perspective view showing a misfuelling prevention apparatus for vehicles, and FIG. 2 is a perspective view showing the misfuelling prevention apparatus for vehicles according to various embodiments of the present invention. As shown in FIGS. 1 and 2, the misfuelling prevention apparatus is adapted to open and close a filler neck by using a flapper that is selectively opened according to the diameter of an oil gun inserted into the filler neck, in which a fuel cannot be filled when a wrong oil gun is inserted.

Thereto, the misfuelling prevention apparatus includes a circular upper housing 10 installed at an inlet of a filler neck, and a circular internal housing 11 disposed within the filler neck such that the internal housing 11 cannot be moved upwards or downwards but can be slid leftwards and rightwards. Any structure generally known in the art that can support the internal housing in the filler neck such that the internal housing cannot be moved upwards or downwards can be employed without limitation.

A rotation prevention guide 24 may be provided in the upper housing 10 to restrict rotation of the stopper 12 through contact with the stopper 12 at a location where the stopper 12 is pushed to one side by a predetermined distance. The rotation prevention guide 24 may be replaced by an inner wall surface of the filler neck according to occasions.

The rotation prevention guide 24 vertically extends downwards from a lower end of a periphery of the upper housing 10. Since the rotation prevention guide 24 is located behind the stopper 12 such that an oil gun can support a rear surface of an upper end of the stopper 12 pushed to one side (where the rotation prevention guide 12 is located) with the oil gun, rotation of the stopper 12 can be prevented.

An internal housing 11 is concentrically disposed at a bottom of the upper housing 10, and thus the oil gun may be inserted along an inside of the upper housing 10 and an inside of the internal housing 11 when the fuel is filled.

In particular, since the internal housing 11 may be slid in leftwards and rightwards (substantially in all directions including forward, rearward, leftward, and rightward directions), the entire internal housing can be moved horizontally when the internal housing is pushed by an oil gun, such as a gasoline gun, having a small diameter, is inserted eccentrically, and/or inserted inclined.

Thereto, a housing spring 17 is disposed at an inner bottom of the upper housing 10 around a hole for insertion of an oil gun. An upper end of the housing spring 17 is fixed to a bottom surface of the upper housing 10 and an upper end of the internal housing 11 is inserted into the housing spring 17.

The housing spring 17 has a conical shape having a wide upper portion and a narrow lower portion, and an upper end of the internal housing 11 also has a conical shape having a wide upper portion and a narrow lower portion. The housing and the spring may be combined to be located at an inside or an outside of each other, but any structure known in the art, such as a circular plate spring and a spring disposed at a portion may be employed without limitation.

In various embodiments of the present invention, since the housing spring 17 and an upper end of the internal housing 11 form a conical combination structure, they can be prevented from being separated from each other. Further, when the internal housing 11 returns to an initial location by a resilient force of the conical housing spring 17, it may be accurately arranged at its proper location.

Then, a lower end of the housing spring 17 enclosing an upper end of the internal housing 11 may be fixed to the internal housing 11. In particular, the housing spring 17 interposed between the upper housing 10 and the internal housing 11 to resiliently support the internal housing 11 has a low resiliency as compared with the stopper spring 13 that resiliently supports the stopper 12. Accordingly, if the oil gun pushes the stopper 12, the internal housing 11 supported by the housing spring 17 having a low resiliency is moved first before the stopper 12 supported by the stopper spring 13 having a high resiliency is rotated.

The stopper 12 is provided as a unit for regulating an operation of the flapper 15 for opening and closing the filler neck. The stopper 12 has an upper contact boss 18 contacting the oil gun, and a lower recess 14 catching the flapper 15. The stopper 12 is located on one side surface of the internal housing 11 to be rotatable about the stopper pin 20. That is, stopper pins 20 on opposite side surfaces of the stopper 12 may be inserted into opposing pin brackets 22 on an outer surface of the housing 11 and may be rotated upwards and downwards about the stopper pins 20.

The contact boss 18 of the stopper 12 may be located within the internal housing through a cutaway portion 19 formed in the internal housing 11, and the rounded contact boss 18 located inside the internal housing 11 may contact the oil gun entering the internal housing.

Stopper springs 13 are installed between the spring pins 23b on opposite side surfaces of the stopper 12 and the spring pins 23a on opposite outer surfaces of the internal housing 11. Accordingly, if the oil gun is withdrawn, the stopper leaned by the oil gun returns to a substantially vertical posture by a resilient force of the stopper spring 13 to hold the flapper 15.

The flapper 15 is provided as a unit for substantially opening and closing the filler neck. The flapper 15 is attached to a bottom of the internal housing 11 in a horizontal posture, and may be rotatable upwards and downwards through one pin structure in the disposition state.

For example, one end of the flapper 15 penetrates into and is supported by the opposite pin brackets 22 located at an opposite side (for example, an opposite location of the stopper) of the internal housing 11 by using the spring pin 21, and the opposite side of the internal housing 11 is located within the recess 14 located in the stopper 12 to be caught in a vertical direction. Accordingly, the flapper 15 may be rotated upwards and downwards about the spring pin 21 while being released from the stopper.

A flapper spring 16 is provided as a unit for returning the flapper 15. One side of the flapper spring 16 is fixed to the internal housing and an opposite side of the flapper housing 16 is fixed to the flapper while the flapper spring 16 is wound several times on the spring pin 21 acting as a rotation pin of the flapper 15. Accordingly, the flapper 15 leaned downwards by the oil gun returns to an original horizontal posture by a resilient force of the flapper spring 16 to enter the recess 14 of the stopper 12.

Meanwhile, the misfuelling prevention apparatus according to the present invention may be applied to both an oil gun for a diesel car and an oil gun for a commercial diesel vehicle, increasing convenience of users. Thereto, an inner diameter of the internal housing 11 is set to a maximum of 32 mm, and may be inserted into both the diesel car gun (Ø24) and the commercial diesel vehicle gun (Ø31).

Since a separation between the contact boss 18 of the stopper 12 protruding toward the internal housing 11 and the opposite wall surface of the internal housing 11 is set to 22 mm to 23 mm, the diesel car gun (Ø24) and the commercial diesel vehicle gun (Ø31) can contact the stopper 12 when they are inserted while interference between the gasoline gun (Ø21) and the stopper can be avoided.

Hereinafter, an in-use state of the misfuelling prevention apparatus will be described.

Figure 3A:
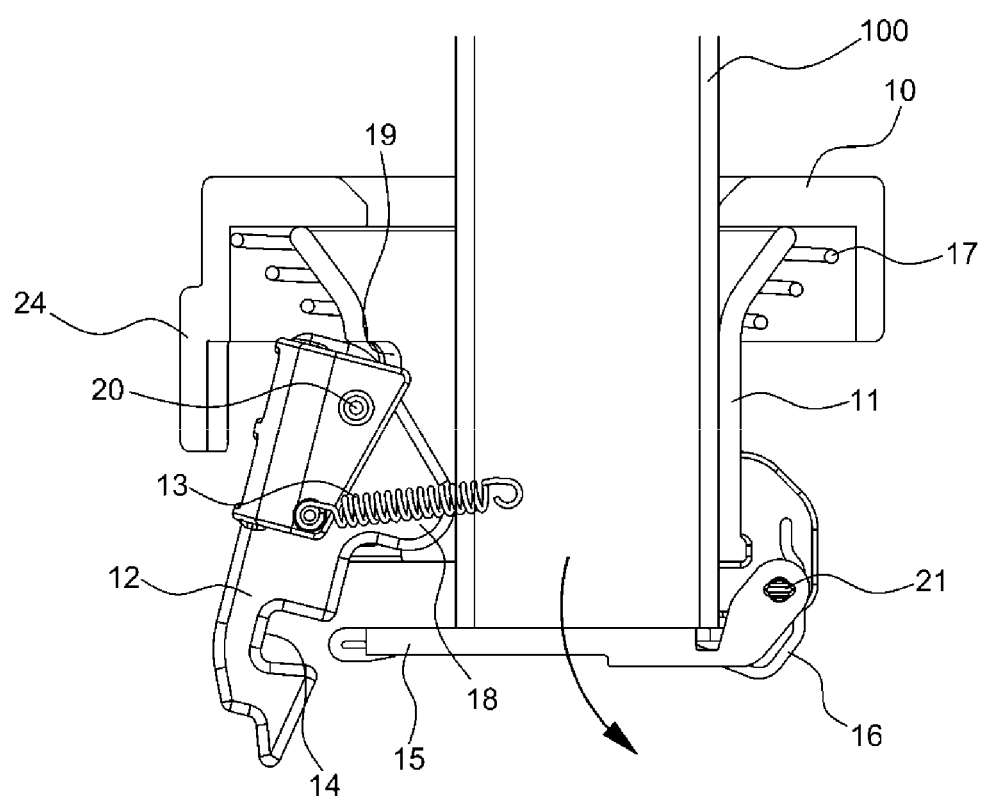
FIG. 3A and FIG. 3B are sectional views showing rotation of a stopper and opening of a flapper in an exemplary misfuelling prevention apparatus for vehicles according to the present invention when a diesel gun is inserted.
Figure 3B:
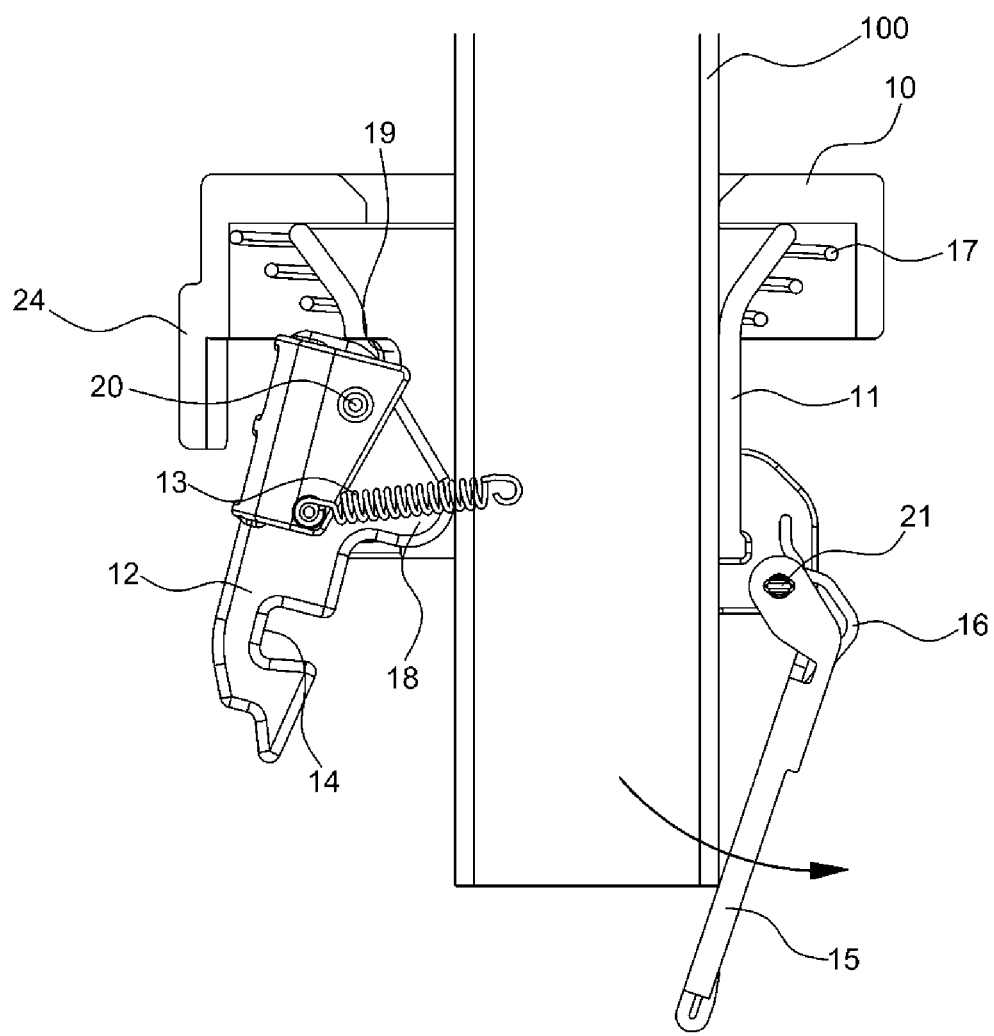
Figure 4A:
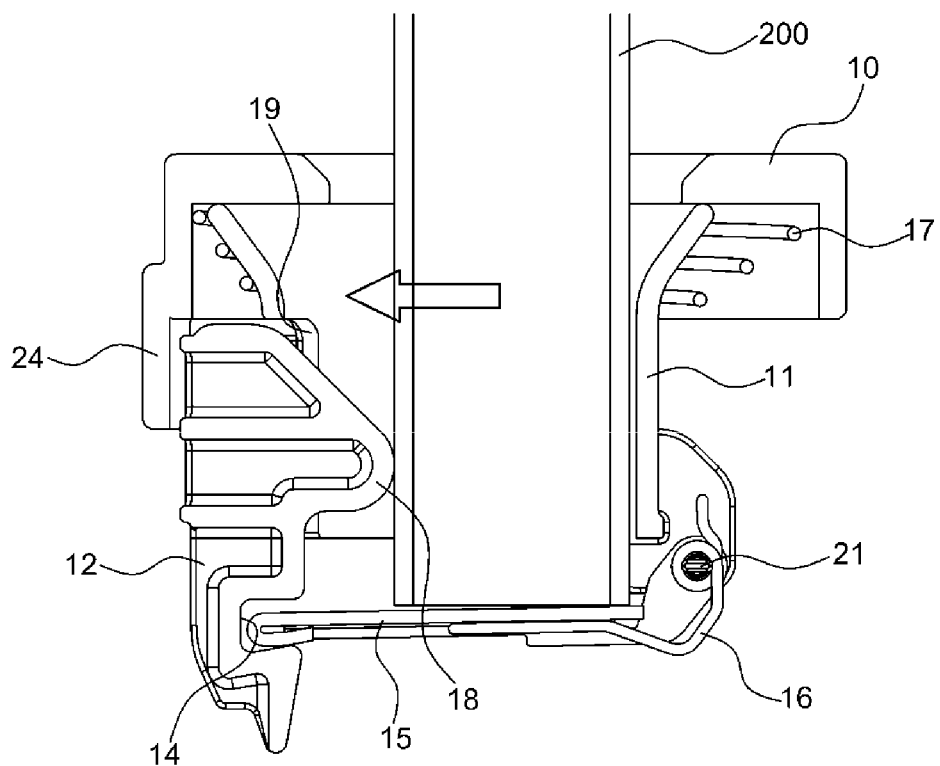
FIG. 4A, FIG. 4B, FIG. 4C, FIG. 4D and FIG. 4E are sectional views and bottom views showing a sliding operation of an internal housing in an exemplary misfuelling prevention apparatus for vehicles according to the present invention when a gasoline gun is inserted.
Figure 4B:
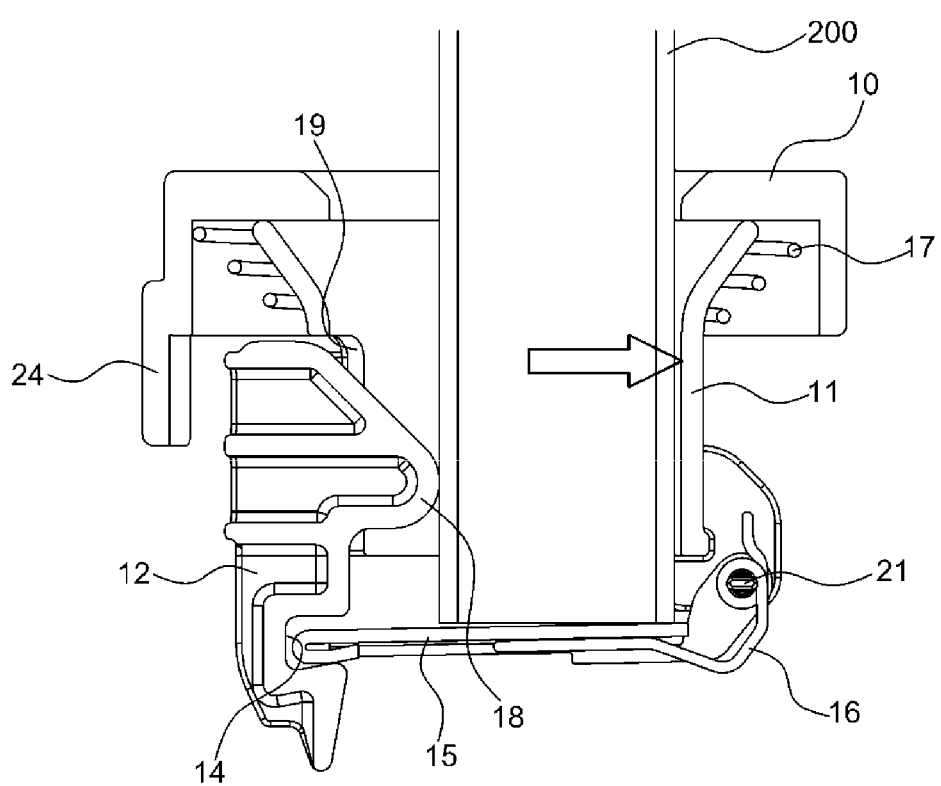
Figure 4C:
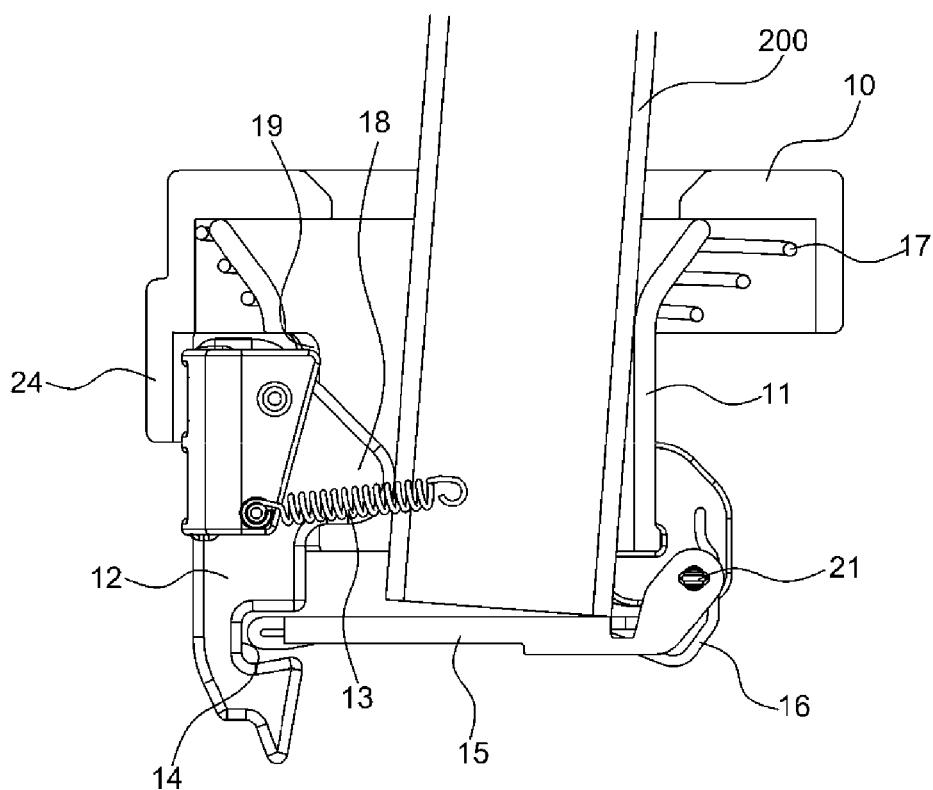
Figure 4D:
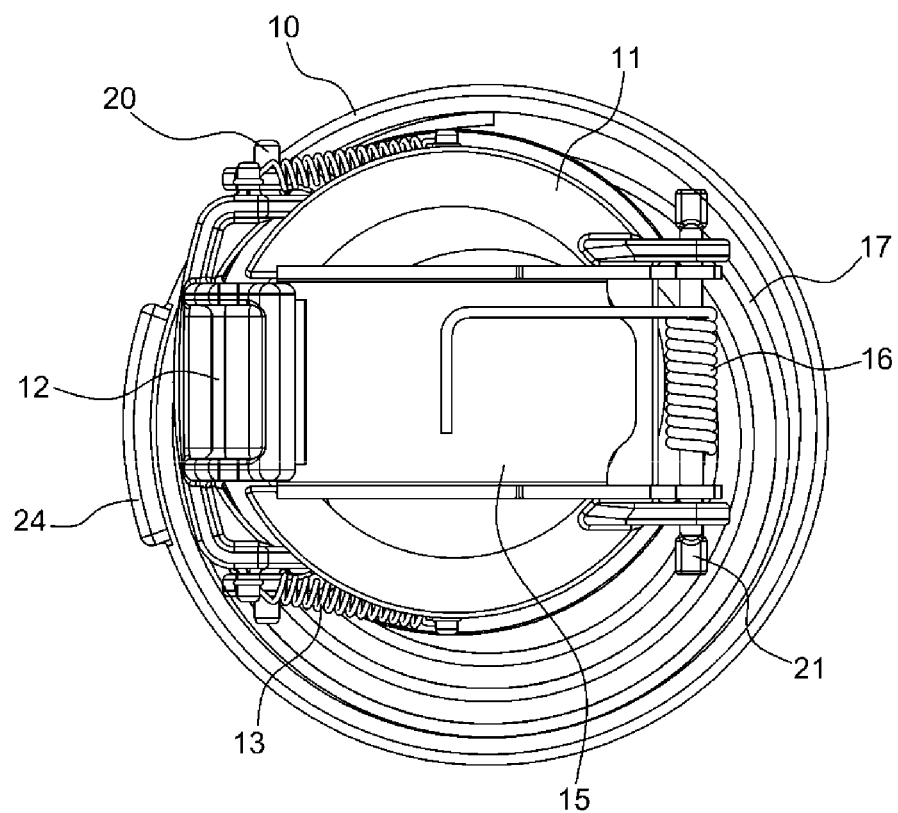
Figure 4E:
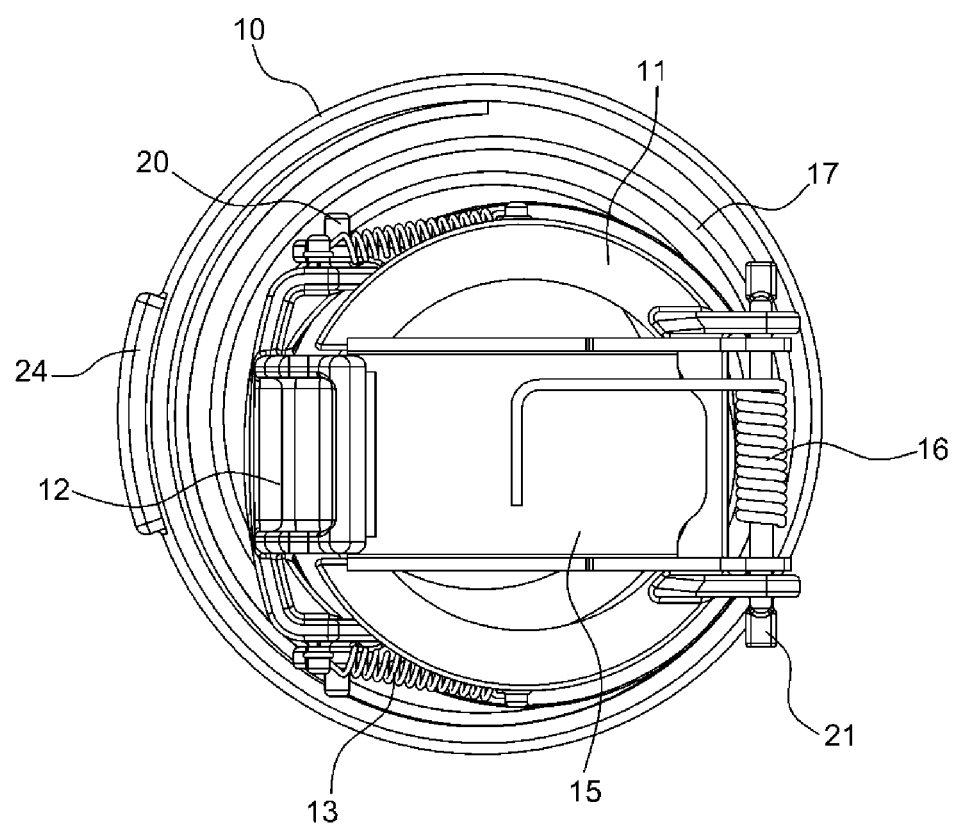

FIGS. 3A and 3B are sectional views showing rotation of a stopper and opening of a flapper in the misfuelling prevention apparatus for vehicles according to various embodiments of the present invention when a diesel gun is inserted. FIGS. 3A and 3B show a state in which a fuel is filled in a filler neck of a diesel vehicle by using a diesel gun.

When a diesel gun 100 larger than a separation 22 mm between the stopper 12 and the internal housing 11 is inserted, the stopper 12 is rotated and leaned by a contact between the diesel gun 100 and the contact boss 18. At the same time, since the flapper 15 is rotated by a force of pushing the diesel gun 100 while the flapper 15 is released from the recess 14 of the stopper 12 and is leaned downwards, a diesel fuel can be filled by using the diesel gun 100.

FIGS. 4A to 4E are sectional views and bottom views showing a sliding operation of an internal housing in the misfuelling prevention apparatus for vehicles according to the embodiment of the present invention when a gasoline gun is inserted. FIGS. 4A to 4E show a state in which a fuel is to be filled into a filler neck of a diesel vehicle by using a gasoline gun.

When a gasoline gun 200 smaller than a separation (22 mm) of the stopper 12 and the internal housing 11 is inserted, the gasoline gun 200 and the contact boss 18 of the stopper 12 do not contact each other. Accordingly, since the stopper 12 and the flapper 15 are caught by each other while the stopper 12 is not rotated, a fuel cannot be filled by using the gasoline gun 200.

Meanwhile, when the gasoline gun 200 is inclined inserted or eccentrically inserted due to carelessness of an operator to push the contact boss 18 of the stopper 12, the entire internal housing 11 is slid in a pushing direction. Thus, the stopper 12 cannot be leaned and a fuel cannot be filled in this case. Further, when a force continues to be applied to the gasoline gun 200 to push the stopper, the stopper 12 is constrained by the rotation prevention guide 24 located in the upper housing 10. Thus, even in this case, the stopper 12 cannot be leaned and a fuel cannot be filled.

Here, the rotation prevention guide 24 may be replaced by an inner wall surface of the filler neck if necessary.

For convenience in explanation and accurate definition in the appended claims, the terms "upper" or "lower", "front"

or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A misfuelling prevention apparatus for vehicles, comprising:
   an upper housing;
   an internal housing located at a bottom of the upper housing, wherein the internal housing is movable respective to the upper housing;
   a housing spring disposed between the upper housing and the internal housing, wherein an upper end of the internal housing is inserted into the housing spring supported by an inner bottom of the upper housing and the internal housing is movable respective to the upper housing by the housing spring;
   a stopper and a stopper spring, the stopper installed at one side of the internal housing to be rotated around a pin by a contact with an oil gun; and
   a flapper and a flapper spring, a first end of the flapper rotatably installed by a pin at an opposite side of the internal housing with respect to the stopper and a second end of the flapper selectively caught in a recess of the stopper, wherein the flapper is to be pushed and selectively opened by the oil gun,
   wherein when an external force is applied to the internal housing, the internal housing is slid relative to the upper housing by the housing spring while being resiliently supported by the housing spring,
   wherein the housing spring has a lower resiliency than the stopper spring to move the internal housing first when the oil gun is contacted to the stopper.

2. The apparatus of claim 1, wherein an upper end of the housing spring and the upper end of the internal housing located within the housing spring have conical shapes with wide upper ends and narrow lower ends.

3. The apparatus of claim 1, wherein a resiliency of the housing spring interposed between the upper housing and the internal housing is smaller than a resiliency of the stopper spring.

4. The apparatus of claim 1, further comprising:
   a rotation prevention guide disposed at one side of the upper housing and behind the stopper for constraining rotation of the stopper.

5. The apparatus of claim 1, wherein an inner diameter of the internal housing is set to a maximum of 32 mm, and a separation between a contact boss of the stopper protruding to an inside of the internal housing and a wall surface of the housing is set to 22 mm to 23 mm.

* * * * *